33-344. SR
2-25-75 JF RE28349

METHOD OF DAMPING DEVICES HAVING OSCILLATORY MOTION

Original Filed Nov. 30, 1967 6 Sheets-Sheet 1

INVENTOR.
HARRY NILS EKLUND
BY
Christie, Parker & Hale
ATTORNEYS.

METHOD OF DAMPING DEVICES HAVING OSCILLATORY MOTION

Original Filed Nov. 30, 1967 6 Sheets-Sheet 2

INVENTOR.
HARRY NILS EKLUND.
BY
Christie Parker & Hale
ATTORNEYS.

METHOD OF DAMPING DEVICES HAVING OSCILLATORY MOTION

Original Filed Nov. 30, 1967 6 Sheets-Sheet 3

INVENTOR.
HARRY NILS EKLUND
BY
Christie, Parker & Hale
ATTORNEYS.

METHOD OF DAMPING DEVICES HAVING OSCILLATORY MOTION

Original Filed Nov. 30, 1967 6 Sheets-Sheet 4

INVENTOR.
HARRY NILS EKLUND

BY

Christie, Parker & Hale
ATTORNEYS.

METHOD OF DAMPING DEVICES HAVING OSCILLATORY MOTION

Original Filed Nov. 30, 1967 6 Sheets-Sheet 5

INVENTOR
HARRY NILS EKLUND
BY
Christie, Parker & Hale
ATTORNEYS.

METHOD OF DAMPING DEVICE HAVING OSCILLATORY MOTION

Original Filed Nov. 30, 1967 6 Sheets-Sheet 6

PHASE PORTRAIT OF EQ. $\psi'' + \sin\psi = 0$

INVENTOR
HARRY NILS EKLUND
BY
Christie, Parker & Hale
ATTORNEYS.

United States Patent

Re. 28,349
Reissued Feb. 25, 1975

28,349

METHOD OF DAMPING DEVICES HAVING OSCILLATORY MOTION

Harry Nils Eklund, Pacific Palisades, Calif., assignor to Lear Seigler, Inc., Santa Monica, Calif.

Original No. 3,577,646, dated May 4, 1971. Ser. No. 687,049, Nov. 30, 1967. Application for reissue May 4, 1973, Ser. No. 357,355

Int. Cl. G01c *19/38*

U.S. Cl. 33—344 10 Claims

Matter enclosed in heavy brackets [ ] appears in the original patent but forms no part of this reissue specification; matter printed in italics indicates the additions made by reissue.

ABSTRACT OF THE DISCLOSURE

A method for damping an oscillating mechanical system to bring it to rest at or near its equilibrium position employing iteratively a fixed damping cycle consisting of a first interval of undamped motion followed by a second interval of supercritically damped motion, the process being iterated a sufficient number of cycles to position the system as close as desired to the equilibrium position.

A preferred application of this method of damping is in connection with a meridian-seeking gyroscope, where the first interval of undampened motion consists of free precession of the gryoscope [pin] *spin* axle toward the meridional plane, followed by a second interval of supercritical damping that positions the spin axle closer to the meridional plane than at the release of the motion. By repeating the appropriately timed intervals of the cycle a number of times, the spin axle of the meridian-seeking gyroscope can be brought as close to the meridional plane as desired.

BACKGROUND OF THE INVENTION

1. Field of the Invention

This invention relates to a method and means of controlling a device having oscillatory motion, and more particularly to damping the device to bring the moving element to rest in, or near, its equilibrium position in a relatively short period of time, and in a more precise and dependable manner than heretofore, which invention has particular applicability to meridian-seeking gyroscopes.

Many devices, such as ordinary gravity pendulums, bifilar and trifilar gravity pendulums, torsion pendulums, spring-centered shafts, and spring-suspended masses, have elements that oscillate or vibrate about an equilibrium position. Oftentimes the oscillation is undesirable, such as for example when the device is a meridian-seeking gyroscope for direct indication of a meridional plane. A pendulous meridian-seeking gyroscope upon the earth's surface having its spin axis horizontal tends to precess under earth's rotation so as to align its spin axis with astronomical north, provided the gyroscope is given angular freedom about its vertical or azimuth axis.

Meridian-seeking gyroscopes are useful as instruments for surveying and, in general, accurate direction finding. However, their usefulness is limited because of the inability to easily and quickly bring the spin axis in alignment with the meridian or astronomical north. In the absence of added damping, it oftentimes takes as much as two days or longer for the spin axis to come to rest at its equilibrium position in the meridian plane after oscillating with respect to this plane.

2. Description of the Prior Art

In the past oscillatory devices have been brought to rest at or near their equilibrium position by applying some type of damping, such as for example, viscous damping or eddy-current damping. In some of the meridian-seeking pendulous gyroscopes a continuous velocity-proportional damping has been applied where the damping torque is less than the critical damping torque of the system. The application of this damping torque will bring the oscillatory element to its equilibrium position after a certain period of time. However, it has been found that in many cases this period of time is excessive and limits the usefulness of the device.

Presently used damping arrangements for meridian-seeking gyroscopes provide a damping torque in azimuth proportional to either the instantaneous angle of elevation of the spin axle, or to the instantaneous angular velocity of the spin axle in the azimuth plane. In either case, the magnitude of the damping torque is chosen, so as to provide somewhat less than critical damping torque, the actual magnitude being a compromise between that required for adequate stability of the gyroscope, after coming to rest in the meridian plane, and that required to bring the spin axle within the allowable error angle, with regard to the meridian plane, in a given time interval after uncaging of the gyroscope.

Generally, such damping arrangements employ a damping ratio less than unity (usually between 0.7 and 0.9), so that the spin axle executes a damped oscillatory motion about the meridian or equilibrium position before settling down within the allowable azimuth error angle. The settling time for a meridian-seeking gyroscope with such a damping arrangement may be on the order of [2 to 2½] *two to two and one-half* times the length of the undamped period of the gryoscope, depending on the actual damping ratio and the magnitude of the initial azimuth angle. However, due to variations in the value of the damping ratio with temperature and other factors, this method introduces a certain element of uncertainty, as to when the amplitude of the oscillations of the spin axle about the meridian have decayed below the magnitude of the allowable azimuth error angle.

SUMMARY OF THE INVENTION

Thus, in accordance with this invention, devices that have oscillatory motion about an equilibrium position are brought to rest in a relatively short interval of time employing iteratively a fixed damping cycle consisting of a first interval of undamped motion followed by a second interval of supercritically [dampened] *damped* motion, the process being iterated a sufficient number of cycles to position the system as close as desired to the equilibrium position.

A preferred application of this method of damping is in connection with a meridian-seeking gyroscope, where the first interval of undamped motion consists of free precession of the gyroscope spin axle toward the meridional plane, followed by a second interval of supercritical damping that positions the spin axle closer to the meridional plane than at [at] the release of the motion. By repeating the appropriately timed intervals of the cycle a number of times, the spin axle of the meridian-seeking gyroscope can be brought as [closed] *close* to the meridional plane as desired.

The method of the present invention has general applicability to any oscillatory mechanical system with plural degrees of freedom and has specific applicability to systems which obey the differential equation $$m\frac{d^2x}{dt^2}+C\frac{dx}{dt}+kx=0$$

Such systems, which include nonpendulous and pendulous meridian-seeking gyroscopes can be represented graphically in a phase-plane diagram by writing the equation for the system in the form $$v\frac{dv}{dx}+2\delta v+x=0$$

where x in the displacement of the system from its equilibrium position, $$v=x'=\frac{dx}{d\tau},\ \delta=\frac{C}{2m\omega_0}$$

$$=\text{damping ratio},\ \tau=\omega_0 t,\ \text{where}\ \omega_0=\sqrt{\frac{k}{m}}$$

and is the angular natural frequency of the system, t is the time, and plotting v versus x. Phase-plane diagrams are very useful in analyzing oscillatory [of] *or* vibratory systems. An example of phase-plane diagram analysis is set out at pages 353–363 in the book entitled "Mechanical Vibrations," Fourth Edition, by J. P. Den Hartog, published by McGraw-Hill Book Company.

When $\delta=0$ the trajectory in the x, v-plane are circles, the radii of which are the initial values, $x_0$ of the displacement. [Then] *When* $\delta$ is different from zero, and much greater than unity, the phase-plane trajectories become virtually straight lines everywhere, except in the neighborhood of an asymptote whose equation is given by $x'+(\delta-\sqrt{\delta^2-1})x=0$, which all other trajectories but one approach asymptotically and proceed along to the stable, singular point at the origin of the phase plane. A point P(x,v), the representative point of the state of the system, progresses in time along a trajectory defined by the initial [condition] *conditions* of the damped motion, and, upon approaching the asymptote, will proceed along this to the origin, which it will reach only after infinite time. One exception to this approach to the origin is the trajectory whose equation is $x'+(\delta+\sqrt{\delta^2-1})x=0$, and which represents a straight line through the origin. No trajectory can cross this straight line, but can only approach it along the above asymptote and will be referred to [here] *herein* in a special sense as a second asymptote of the system, along which the motion rapidly proceeds to the proximity of the singular point at the origin. These two asymptotes are trajectories of slowest and fastest approach, respectively, to the singular point of the origin.

The method of damping the system, whose equilibrium position coincides with the singular point in the phase plane, consists in releasing the system with zero velocity from its displaced position, allowing the representative point to proceed along the circular trajectory, defined by the initial displacement, until the representative point arrives at the intersection between the undamped trajectory and the damped trajectory represented by the "fast" asymptote. At this point the damping is switched on, and the representative point, P(x,v), moves rapidly along the fast asymptote into the proximity of the stable singular point at the origin, which is the equilibrium position of the system.

The fast asymptote is, thus, the equivalent of a switching line, except that the switching action is not initiated by the fast asymptote, but rather by [determining] *predetermining* the interval of the undamped motion so that at the time of switching the representative point will be at the fast asymptote.

However, due to errors in the timer, it may happen that the switching from the undamped to the damped state of the system occurs either too early or too late so that, instead of proceeding directly to the origin along the fast asymptote, the representative point will proceed along one of the neighboring trajectories, become "captured" by the "slow" asymptote and, thus, never reach the origin, or the equilibrium position. To remedy this failing, the original cycle, consisting of a first time interval of free, undamped motion followed by *a* second timed interval of damped motion, is repeated by starting a new interval of undamped motion from the final position of the representative point at the slow asymptote. After completing the second cycle, the point will again virtually come to rest on the slow asymptote. The second encounter of the representative point with the slow asymptote represents a position closer to the origin, than at the first encounter after the first damping cycle. Thus, by iterating the process a number of cycles, it is possible to get as close to the origin as desired, despite errors in timing of the free, undamped interval of motion.

It is apparent that the slow and the fast asymptotes, which are characteristic of the system, serve as reference or guidelines, and that in particular the slow asymptote will establish a fixed reference line, from which the undamped motion will start each cycle, thus preventing a cumulative error in position of the system state point, or representative point P, for a single, constant error in the timing of the undamped interval of motion.

This type of damping process is of particular value in the damping of a meridian-seeking gyroscope so that it will come to rest in or near to the meridional plane rapidly and from any initial displacement.

The use of the fast asymptote and the slow asymptote as ["-] "switching lines" is a special case of the more general approach of employing any two selected switching lines, one to determine the time for applying the supercritical damping and the other to determine the time for removing the damping and allowing undamped or proper motion.

The determination of the interval of time for the representative point P to intercept the selected switching line at the end of the initial undamped motion is simplified if the moving element of the system starts with no initial velocity. This is accomplished by applying supercritical damping simultaneously with the release of the system from its initial displacement. This brings the slow asymptote into existence, and as a result the representative point, which is now moving on a damped trajectory, cannot cross the slow asymptote, but comes virtually to rest thereon, so that the undamped motion will be initiated from the slow asymptote.

The apparatus for selectively applying the damping force includes a means for sensing the speed at which the element moves toward its equilibrium position. The apparatus further includes a means responsive to the sensing means and thus to the instantaneous velocity of the element for generating a damping force that is proportional to the velocity of the moving element. This damping force is applied to the moving element through a timer switch which sets the interval of time during which the damping force is applied and sets the interval of time between the applications of the damping force, when iterative damping is employed.

The time interval between the applications of the damping force, as well as the magnitude of the damping force are adjustable to compensate for changes in operating conditions, for example to compensate for changes in latitude when the moving element is the spin axle of a meridian-seeking gryoscope.

Alternatively, the generated damping force may be proportional to the square of the instantaneous velocity [on] *or* it may be primarily proportional to the instantaneous velocity below a first selected magnitude of velocity and primarily proportional to the square of the instantaneous velocity above a second selected magnitude of velocity.

BRIEF DESCRIPTION OF THE DRAWINGS

The above and other features and advantages of the present invention may be understood more fully and clearly upon consideration of the following specification and the accompanying drawings in which:

FIGS. 7 and 8 are phase plots graphically depicting a preferred method of iterative damping in accordance with the present invention;

DESCRIPTION OF THE PREFERRED EMBODIMENTS

Figure 1:
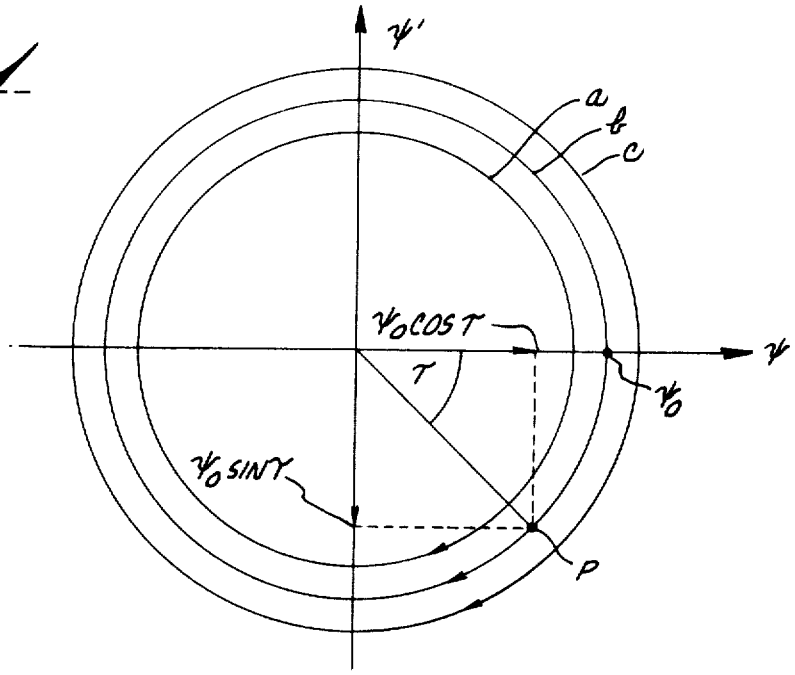
FIG. 1 is a phase-plane representation of the normalized motion of an undamped oscillatory or vibratory element.

Devices that have elements that oscillate or vibrate about an equilibrium position may be analyzed more easily by considering mathematical equations for the motion of the element and graphical plots of the solutions of the equations for the motions of the device.

In one embodiment of this invention the device having an oscillatory element having periodic motion about an equilibrium position is a meridian-seeking gyroscope, although the invention is in no way limited to this particular device for it is equally applicable to any device having oscillatory motion, such as ordinary gravity pendulums, bifilar and trifilar pendulums, torsion pendulums, spring-centered shafts and spring-suspended masses, for example. However, a meridian-seeking gyroscope will be employed in describing the invention.

In general there are two types of meridian-seeking gyroscopes, either of which could be used in describing the invention. These are the pendulous gyroscopes and the nonpendulous gyroscopes. The pendulous meridian-seeking gyroscope will be employed in this description.

Such a gyroscope includes a spinning rotor, spin axle, suitably mounted in a stator frame, with means for keeping it spinning. The gyroscope proper is enclosed in *a* frame, which [is] *in* a penduluous horizontal axis gyrocompass has [2°] *two degrees* of freedom, [1°] *one degree* of freedom about an elevation axis and another degree of freedom about an azimuth axis. In using a pendulous gyroscope to describe the invention, the spin axle movement will be taken to be synonymous to movement of the frame enclosing the gyroscope proper of the illustrative gyroscope.

For small angles of displacement the equations of motion of a damped pendulous meridian-seeking gryscope may be written in the simplified form $$C\frac{d\psi}{dt}+H\Omega\psi-H\frac{d\theta}{dt}=0 \qquad (1)$$

and $$H\frac{d\psi}{dt}+M\theta=0 \qquad (2)$$

where C is the damping moment coefficient about the azimuth axis; $\Psi$ is the azimuth angle, with the angle being positive to the east; H is the angular momentum of the gyro rotor about the spin axis; $\Omega$ is the local horizontal component of the earth's spin velocity, $\omega_e$; $\theta$ is the elevation angle, which is positive upward; M is the pendulous moment about the elevation axis; and t is time.

In these equations, 1 and 2, the damping about the elevation axis and the moments of inertia of the gyro container and the gyro wheel about the two axes perpendicular to the spin axis have been neglected. These quantities are negligibly small compared to the remaining quantities, and are generally ignored in analyzing the performance of a pendulous meridian-seeking gyroscope. The absence of these quantities in the following mathematical equations in no way invalidates the results of the analysis, but makes the system amenable to phase-plane representations. Additionally, it is convenient to normalize equations 1 and 2 by introducing nondimensional time defined by [$\lambda=\omega_0 t$,] $\tau=\omega_0 t$, where $\omega_0$ is the natural undamped frequency of the system (*i.e.* $2\pi/T$, *where T is the undamped natural period of the system*) *and* $\omega_0$ *is* given by $$\omega_0^2=\frac{M\Omega}{H}$$

and by setting $$\frac{C\omega_0}{H\Omega}=2\delta$$

and $$\frac{\omega_0\theta}{\Omega}=\xi$$

$\delta$ is commonly called the damping ratio and is defined as the ratio of the actual damping moment coefficient, C, to the hypothetical damping coefficient having the value [$2H/\omega_0$] $2H\Omega/\omega_0$, which hypothetical damping coefficient produces critical damping. When these substitutions are made in equations 1 and 2 the following results:

$$2\delta\frac{d\psi}{d\tau}+\psi-\frac{d\xi}{d\tau}=0 \qquad (3)$$

and $$\frac{d\psi}{d\tau}+\xi=0 \qquad (4)$$

As is well known, the end of a spin axle of an undamped gyroscope traces an elliptical path in a vertical plane which is perpendicular to the meridional plane with the major axis in the azimuth plane and the minor axis in the meridional plane. With the substitution $$\frac{\omega_0\theta}{\Omega}=\xi$$

the elliptical path normally traced by the spin axle becomes a circle, which greatly facilitates the representation of the motion. The damped motion will, of course, be correspondingly modified since the elevation and azimuth axes now have the same scale factor.

Separating the variables in equations 3 and 4 results in the equations $$\frac{d^2\psi}{d\tau^2}+2\delta\frac{d\psi}{d\tau}+\psi=0 \qquad (5)$$

$$\xi=-\frac{d\psi}{d\tau} \qquad (6)$$

Equation 5, which represents the azimuthal motion, is a second order differential equation having a single parameter $\delta$, which denotes the damping ratio of the system. Thus, $\delta<1$ represents an under-damped system, the solution of which can be expressed by a damped sinusoid. $\delta=1$ results in "critical" damping which gives rise to a damped linear algebraic function, while $\delta>1$ represents an over-damped or supercritically damped system. Finally, in the case where $\delta=0$, the solution is an undamped sinusoid rpresenting, for small angles ,a simple harmonic motion.

The solution of the equations, 5 and 6, for the undamped case and for the supercritically damped case, where $\delta>>1$, are respectively given by $$\psi=\psi_0\cos\tau-\xi_0\sin\tau \qquad (5a) \qquad \xi=\psi_0\sin\tau+\xi_0\cos\tau \qquad (6a)$$

$\delta=0$, and the set of solutions for $$\psi=\epsilon^{-\delta\tau}\left[\psi_0\cosh\eta\tau+\frac{\delta\psi_0-\xi_0}{\eta}\sinh\eta\tau\right] \quad (5b)$$

$$\xi=\epsilon^{-\delta\tau}\left[\xi\cosh\eta\tau+\frac{\psi_0-\delta\xi_0}{\eta}\sinh\eta\tau\right] \quad (6b)$$

for $\delta\gg1$, where $\psi_0$ is the initial azimuth angle, $\xi_0$ is the initial elevation angle, and $\eta\sqrt{\delta^2-1}$.

Equation 5 is a general equation for a damped linear oscillatory system that has a single degree of freedom. A single-degree-of-freedom spring system is an example of such a system. A discussion of this system and the resultant differential equation is set out in the Den Hartog book "Mechanical Vibrations" at pages 24 to 26. Additionally, equation 5 is the same for both pendulous and nonpendulous [meridan] *meridian* seeking gyroscopes for their azimuth motion, where $\psi$ is the azimuth angle and $\delta$ is the damping ratio about the azimuth axis. For a nonpendulous gyroscope, however, the natural frequency of the undamped motion is given by $$\omega_0=\sqrt{\frac{H\Omega}{I}},$$

where I is the moment of inertia about the azimuth axis.

For purposes of better illustrating the present invention the behavior of the gyroscope is depicted in a special type coordinate plane known as the phase plane in which the nondimensional azimuth velocity, $d\psi/d\tau$, of the spin axle is plotted against the azimuth displacement, $\psi$, of the spin axle. Phase-plane diagrams are useful in analyzing oscillatory systems and a specific example is set out at pages 353–363 of the above-referred to book by Den Hartog. By introducing the abbreviation $$\psi'=\frac{d\psi}{d\tau}$$

equation 5 can be rewritten as follows:

$$\psi'\frac{d\psi'}{d\psi}+2\delta\psi'+\psi=0 \quad (7)$$

in which the dimensionless time $\tau$ has been eliminated to obtain an equation in $\psi$ and $\psi'$. The solution of equation 7 is the locus for the spin axle in the $\psi$, $\psi'$ plane.

*Since*

$$\tau=\omega_0 t$$
$$d_\tau=\omega_0 dt$$

*therefore*

$$\psi'=\frac{d\psi}{d\tau}=\frac{d\psi}{\omega_0 dt}$$

*that is $\psi'$ equals the instantaneous velocity $d\psi/dt$ divided by the undamped natural frequency of oscillation.*

A point P may be employed on the phase-plane diagram to represent the state of the system at any instant. Thus, point P represents the displacement and velocity of the end of the spin axle at a particular time and will be hereafter referred to as the representative point P.

When the damping ratio $\delta=0$, equation 7 reduces to $$\psi'\frac{d\psi'}{d\psi}+\psi=0 \quad (8)$$

which has the well-known solution $$[\psi'^2+\psi\text{axC}]\ \psi'^2+\psi^2=C \quad (9)$$

where the constant on the right side is determined by the initial conditions. Thus, if at $\tau=0$, $\psi'=0$ and $\psi=\psi_0$, this constant, C, will be equal to $\psi_0^2$ and equation 9 becomes $$[\psi'^2+\psi^2\text{aX}\psi_0^2.]\ \psi'^2+\psi^2=\psi_0^2 \quad (9a)$$

This is the equation of a family of concentric circles of radius $\psi_0$ and corresponds to the undamped precessional motion of the gyro due to the action of the pendulous moment in conjunction with the earth's rotation.

The phase-plane representation of equation 9a is depicted in FIG. 1 with curves a, b, and c representing some of the possible solutions. In FIG. 1, the representative point P moves clockwise with constant angular velocity along the circular trajectory of radius $\psi_0$. The instantaneous position of paint P is defined by the angle $\tau$, which according to convention, is negative. The instantaneous values of $\psi$ and [104'] $\psi'$ are thus given by $\psi=\psi_0\cos\tau$ and $\psi'=\psi_0\sin\tau$.

An alternative way of considering the undamped precessional motion of the spin axis of a meridian-seeking gyroscope would be to plot displacement $\xi$ which is proportional to the displacement along the elevation axis, against the displacement $\psi$ along the azimuth axis, that is, to plot the behavior of the gyro using the $\psi$, $\xi$ coordinate plane. Since $\xi$ equals negative $\psi'$ (equation 6), this coordinate plane may be represented by taking FIG. 1 and rotating the phase-plane representation through 180° about the $\psi$ axis. This will produce the more familiar $\psi$, $\xi$ plane, in which the motion proceeds counterclockwise, and the angle $\tau$ is positive.

Figure 2:
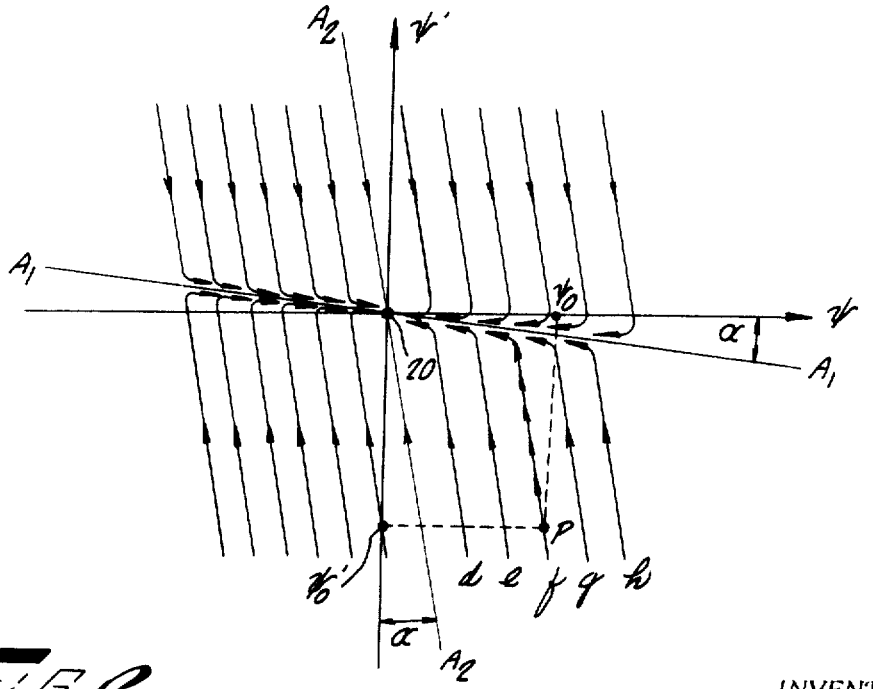
FIG. 2 is a phase-plane representation of the normalized motion of an over-damped or supercritically damped moving element having oscillatory motion.

For supercritically damped systems, where $\delta>>1$, it will be seen that the solution for equation 7 results in a phase-plane representation that is drastically different from the plot where $\delta=0$, which is depicted in FIG. 1. The solution curves of equation 7 for $\delta>>1$, form a family of trajectories as depicted in FIG. 2. These trajectories are virtually straight parallel lines, such as lines d–h in FIG. 2, except in the region surrounding the straight line marked A1—A1. The equation for line A1—A1 is $\psi'+(\delta-\sqrt{\delta^2-1})\psi=0$. This line as an asymptote that cannot be crossed by any solution curve and all of the latter will therefore approach this line asymptotically and will then move along it toward the singular point at the origin, 20.

For example, as shown in FIG. 2 a trajectory point P starting at given initial conditions $\psi=\psi_0$, $\psi'=\psi_0'$ will travel on the trajectory f passing through the point $\psi_0$, $\psi_0'$ approaching A1—A1 asymptotically while moving toward the origin 20, which is the point of stable equilibrium.

The motion along asymptote A1—A1 is the slowest approach to the origin, which approach is representative of the "creeping" motion generally encountered in overdamped systems.

In the present invention a supercritical damping ratio is employed. For illustrative purposes it is assumed that this damping ratio is 10 times the critical damping. Such a large value of damping ratio as $\delta=10$, causes the motion along the line A1—A1 to be so slow as to make the settling time of the gyro hundreds of times longer than can be practically tolerated. However, as will be described hereinafter, the otherwise undesirable characteristic of the slow asymptote is employed in the method and appartus of the present invention to aid in bringing the oscillatory or vibratory element to rest at or near the equilibrium point in a relatively short interval of time.

The trajectory along the line A2—A2, which passes through the origin 20, as shown in FIG. 2, constitutes a trajectory of fastest approach to the origin. Thus, if a trajectory originates on this asymptote, A2—A2, or is by some means made to enter thereupon, the representative point P will move rapidly along the asymptote toward the origin and reach the proximity thereof in the shortest possible time. The equation for line A2—A2 is $$[\psi'+(\delta+\delta^2-1)\psi=0.]$$

$$\psi'+(\delta+\sqrt{\delta^2-1})\psi=0.$$

*Therefore, the magnitude of $\psi'$ to $\psi$ is given by*

$$\left|\frac{\psi'}{\psi}\right|=\delta+\sqrt{\delta^2-1}$$

*which for $\delta >> 1$, gives*

$$\frac{\psi'}{\psi} = 2\delta$$

*since*

$$\psi' = \frac{1}{\omega_0}\frac{d\psi}{dt} = \frac{T}{2\pi}\frac{d\psi}{dt}, \frac{\psi'}{\psi} = \frac{\frac{T}{2\pi}\frac{d\psi}{dt}}{\psi} = 2\delta \text{ or } \frac{\frac{d\psi}{dt}}{\psi} = \frac{4\pi\delta}{T}$$

*That is, the magnitude of the ratio of the instantaneous velocity to the instantaneous displacement, for all points along the fast asymptote is equal to*

$$\frac{4\pi\delta}{T}$$

*or the product of $4\pi$ and the damping ratio divided by the undamped natural period of oscillation.*

Since the origin is a stable singular point, the representative point P travelling along the fast asymptote comes to rest in the proximity of the meridional plane, which plane passes through the origin and is perpendicular to the $\psi$ axis.

The slow and fast asymptotes A1—A1 and A2—A2, respectively, in FIG. 2 are displaced from the axes $\psi$, [104'] $\psi'$ by an angle $\alpha$. This angle $\alpha$ is directly dependent upon the selected damping ratio $\delta$, and since by definition, $$\delta = \frac{1}{2}\frac{C\omega_0}{H\Omega}$$

$\delta$ is directly dependent on the basic characteristics of the system. As the damping ratio $\delta$ increases, the angle $\alpha$ decreases and for an infinite damping ratio $\delta$, $\alpha$ would be zero so that the fast asymptote would coincide with the $\psi'$ axis and the slow asymptote would coincide with the $\psi$ axis of the phase-plane representation in FIG. 2.

As depicted in the phase plane, where [$\psi$] $\delta$ is assumed to be [10] *10*, FIG. 2, the family of curves resulting from the solution of equation 7 consists of trajectories that are virtually straight parallel lines, except in the vicinity of the slow asymptote, A1—A1. The trajectories for $\delta = 10$ are more nearly perpendicular to the $\psi$ axis than shown in FIG. 2 and the subsequent FIGS. of the drawing. This is because the angle $\alpha$ is exaggerated to show more clearly the relationship of the terms of the equations. For example, the angle $\alpha$ in FIG. 2 is depicted as being between 6° and 7°, while in actual practice the angle is less than 3° for a damping ratio $\delta = 10$.

Figure 8:
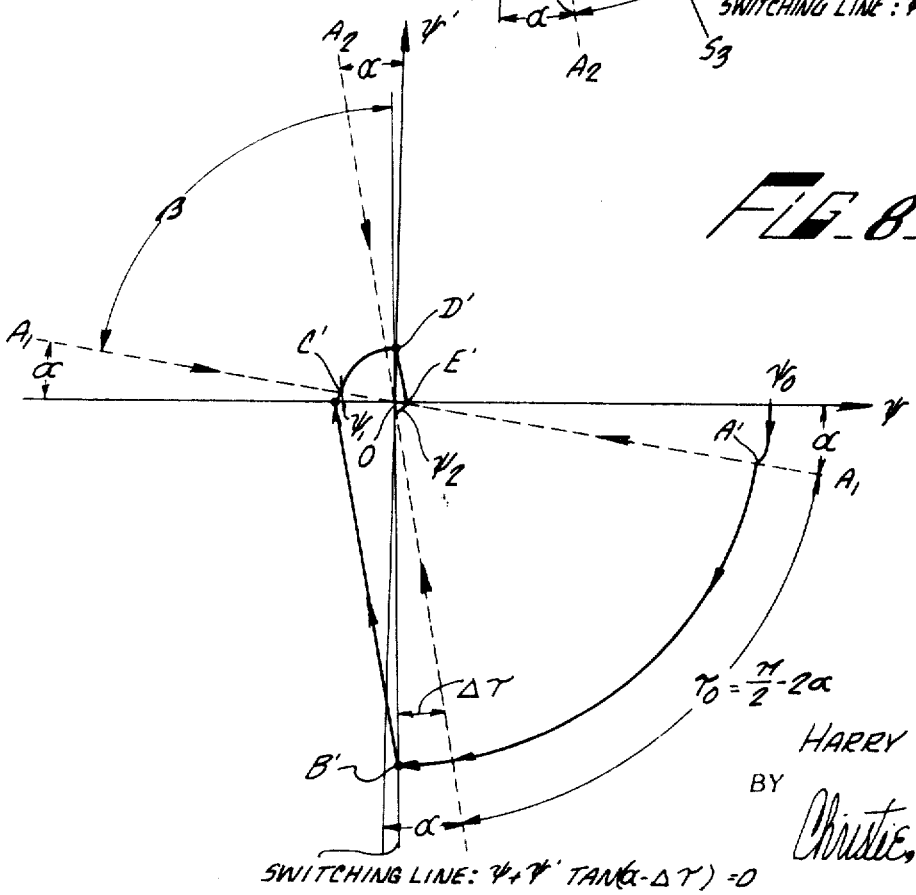

As the damping ratio $\delta$ is increased above the assumed value of 10, the trajectories become straighter and more parallel to each other up to the point where the damping ratio is infinite and the trajectories become parallel to the $\psi'$ axis. Conversely, as the damping ratio is decreased below 10, the family of trajectories becomes less straight and more curved up to the point where $\delta = 0$, with a resultant family of concentric circles. Trajectories for $\delta = 1.25$ are shown in FIG. 8.23 on page 356 of the above-identified book. The shortest possible time in which the gyro spin axis can be brought to the meridian plane, as seen by combining FIGS. 1 and 2, is to bring the representative point P along a circular trajectory representing undampened motion onto the fast asymptote A2—A2 and then allow point P to follow this asymptote to the origin, which is located in the meridian plane.

Figure 3:
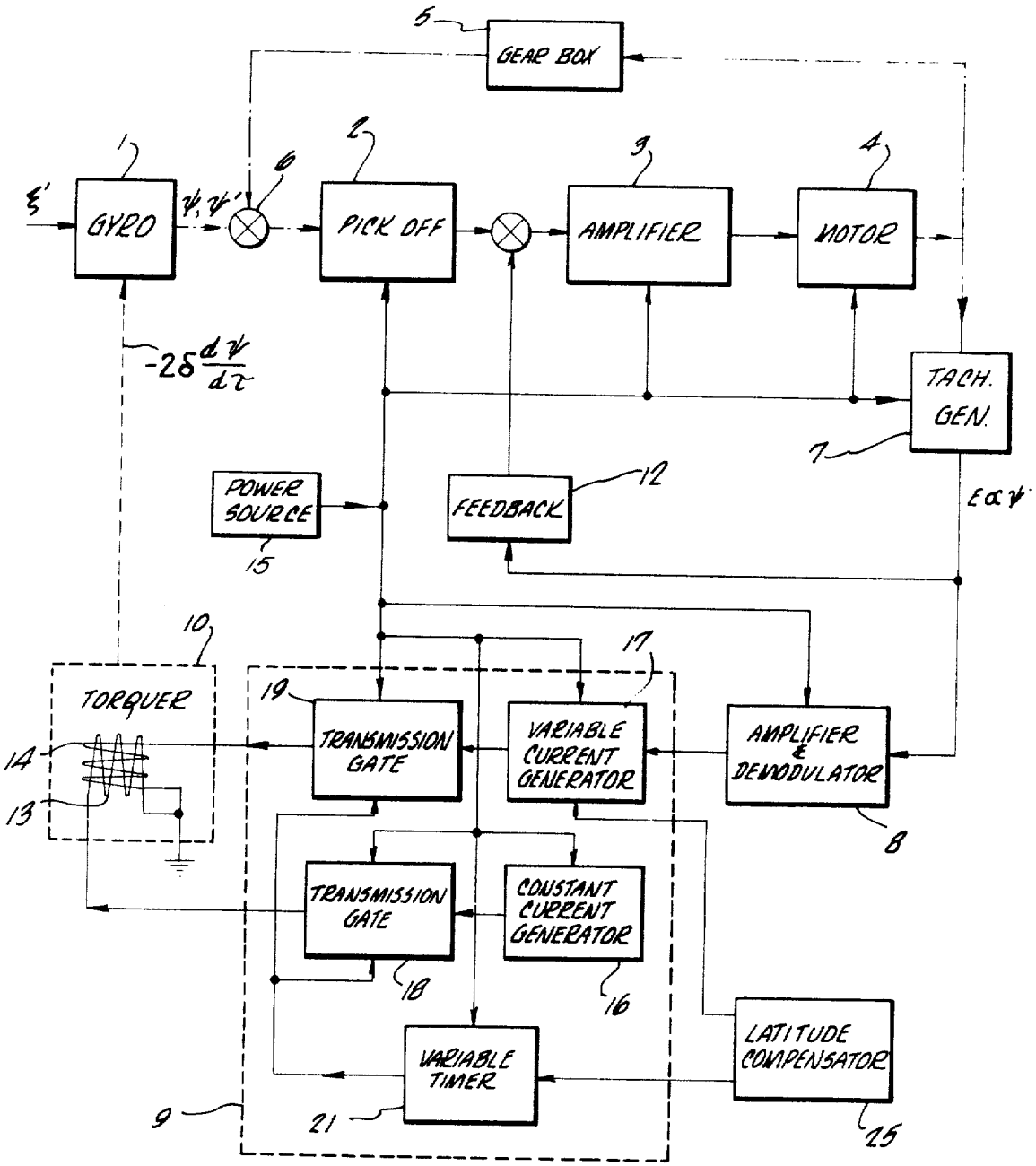
FIG. 3 is a block diagram of the damping apparatus in accordance with the present invention.

An apparatus for performing the method of the present invention is depicted schematically in the block diagram of FIG. 3. For illustrative purposes, the device to be controlled is assumed to be a meridian-seeking gyroscope having precessional motion with displacement about both azimuth and elevational axes.

The operation of the control system depicted in FIG. 3 is described with reference to the phase plane as representatively depicted in FIGS. 1 and 2. The azimuthal movement of the spin axle of the gyroscope is set forth by equation 7 and conforms to the solutions of this equation, when $\delta = 0$ and $\delta = 10$ as depicted in FIGS. 1 and 2, respectively. The inputs to the gyroscope, which are shown schematically on FIG. 3, are $\xi'$ and $-2\ \delta\psi'$ to which the gyroscope responds with the outputs $\psi$ and $\psi'$. When $\delta$ equals zero the only input is $\xi'$ and the gyroscope executes a simple harmonic motion, the precessional motion depicted in FIG. 1. On the other hand, for $\delta$ equal to 10, the motion of the gyroscope, which is described by the representative point P, will be along one of the trajectories shown in FIG. 2.

The control system operates on the azimuth motion of the spin axle, which is the oscillatory of vibratory element of the meridian-seeking gyroscope 1 in FIG. 3. The control system includes a pickoff [1] *2* coupled to the azimuth motion of the spin axle of the gyroscope 1 and has an output representative of the displacement and velocity of the gyroscope spin axle in the azimuth plane. The output of the pickoff 2 is amplified by amplifier 3 and applied to motor 4. The output of the motor 4 is coupled back to the input of the pickoff 2 through a speed-reduction mechanism, such as a gear box 5. The displacement output of the gear box combines with the displacement output from the gyroscope to form a summing junction 6. The coupling between the gear box 5 and the motor 4 and the gear box 5 and the summing junction 6 is mechanical, which mechanical coupling is shown by [dotted] *dash-dot* lines in the drawing. Thus, the azimuth motion of the gyroscope 1 is followed up by a servosystem consisting of pickoff 2, amplifier 3, motor 4, and gear box 5.

A typical pickoff and servoloop for a meridian-seeking gyroscope is described in the copending U.S. Pat. application Ser. No. 529,325, filed Feb. 23, 1966, by Leonard R. Ambrosini and assigned to the same assignee as this application now U.S. Pat. No. 3,512,264. For purposes of illustration, it will be assumed that the gyroscope 1, pickoff 2, amplifier 3, motor 4, and gear box 5 of FIG. 3 are similar to the corresponding elements in the referenced application.

The output of the motor 4 is also applied to a tachometer-generator 7, the output voltage of which is applied to an amplifier and demodulator 8. The output voltage of the tachometer-generator 7 is representative of the angular velocity and is proportional to the angular velocity of the spin axle in the azimuth plane and is applied to a timer and damping controller 9 for generating a damping torque about the azimuth axis, which torque is proportional to the instantaneous velocity of the spin axle in the azimuth plane. The damping torque is applied to the oscillatory element, that is to the gyroscope 1 through a torquer 10.

In the servo described above, the gear box 5 allows the motor 4 to run at a relatively high speed for more uniform motion. This relatively high speed also increases the output voltage of the tachometer-generator 7 mounted on the shaft of motor 4. The relative displacement between the gyrodriven part of the pickoff 2 and the motor-driven part of the pickoff 2 generates an error signal $\epsilon$. This error signal is amplified by amplifier 3 and applied to the motor 4 with such a polarity that it reduces the pickoff error signal. Phase and amplitude compensation may also be provided in the amplifier to improve the servoresponse.

Additionally, the stability of the servo may be improved by applying the velocity feedback signal from the output of the tachometer-generator 7 through a feedback network 12 to the input of the amplifier 3 as shown in FIG. 3.

The output voltage of the tachometer-generator 7, which is proportional to the azimuth velocity $d\psi/dt$, is amplified and demodulated in the amplifier and demodulator 8 and then fed to the timer and damping controller 9, which controls the inputs to the gyroscope torquer 10.

The gyroscope torquer 10 is depicted to FIG. 3 by coils 13 and 14, whose axes are at right angles to one another. Coil 13 is mounted on the gyroscope housing and carries a constant current [I] $I_1$. Coil 14 is mounted on the servo followup of the gyroscope and carriers a variable current $I_2$ which is proportional to the tachometer-generator 7 output voltage, which is proportional to the output velocity $d\psi/dt$ of the gyroscope. Coil 13 cooperates with coil 14 so that when both coils are appropriately excited a torque will be developed about the azimuth axis of the gyroscope. The gyroscope torquer 10 thus furnishes the damping term $(2_2\psi')$ about the azimuth axis of the gyroscope. The torque exerted by one coil on the other is given by $T=C_1I_1I_2$, where $C_1$ is a constant of proportionality. Since $I_1$ is constant and $I_2$ is proportional to $\psi'$, it is evident that $T=C_2\psi'$, where $C_2$ is another constant of proportionality. By giving $\delta($ the proper value so that $$C_2=C_1I_1=2\delta,$$

one thus achieves that $T=2\delta\psi'$, which is the desired instantaneous value of the damping torque to be impressed upon the gyroscope. While the damping torque is shown in FIG. 3 as being applied to the gyroscope or moving element by way of a torquer, it could be applied to any suitable manner. For example, it could be applied by use of some type of coulomb damping or viscous damping.

After the gyroscope has reached its operating speed and has generally been oriented in the direction of the meridian by some other means, for example a magnetic compass, the meridian-seeking operation may be initiated by uncaging the gyroscope. At the time the gyroscope is uncaged, power is applied to the control system of FIG. 3 from the power source 15. At this time the timing sequence established by the timer and damping controller 9 begins.

Figure 4:
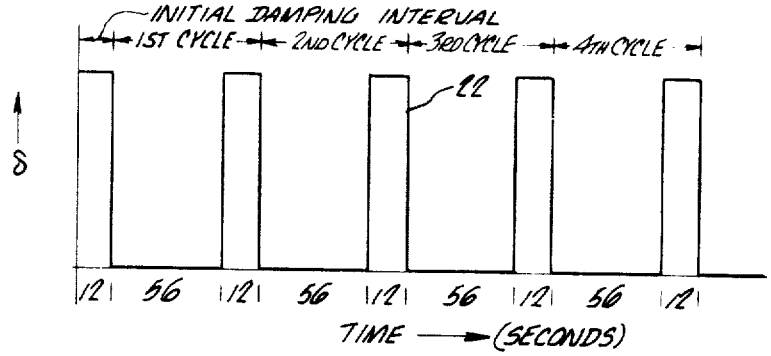
FIGS. 4 and 5 are graphs of the damping ratio versus time of the iterative damping in accordance with the present invention.
Figure 5:
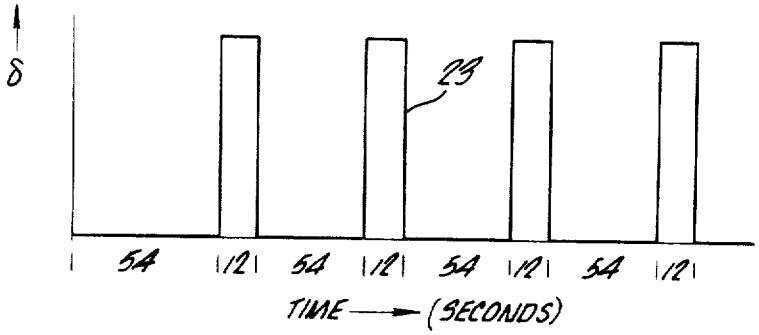

Timer and damping controller 9 includes a constant current generator 16 and a variable current generator 17, which is responsive to the output voltage of the tachometer-generator 7 through the amplifier 8 and thereby responsive to the instantaneous velocity $d\psi/dt$ of the gyroscope about the azimuth axis. The outputs of the generators 16 and 17 are applied to the torquer 10 through transmission gates 18 and 19, respectively. The conduction states of the transmission gates 18 and 19 are controlled by the output of a variable timer 21. When the variable timer has an output signal of a particular polarity the gates will be placed in their conduction state to pass the signal from the associated current generator. In this manner, the duration of the interval of each damping pulse may be controlled as well as the interval between the damping pulses by programming the variable timer 21. Additionally, the application of the first damping pulse may be controlled and may be timed to take place at the moment of uncaging, as representatively shown in FIG. 4, or at some later selected time, as shown in FIG. 5. In the charts of FIGS. 4 and 5, the application of the damping ratio $\delta$ is shown on a time scale, the time intervals being predetermined by the variable timer 21. The curves 22 and 23 of FIGS. 4 and 5 occur at the same time as the output signal from the variable timer 21 which opens the transmission gates 18 and 19. The time scale and the intervals of time on FIGS. 4 and 5 are shown for an illustrative meridian-seeking gyroscope having a natural undamped period of 240 seconds at a particular latitude.

Ideally, during the initial period after uncaging, the gyroscope precesses without damping for the length of time required for the representative point P on the circular trajectories of FIG. 1 to intersect the fast asymptote A2—A2 of FIG. 2. At this time, the full damping torque is switched on by the timer, and as a result, the representative point P travels along the fast asymptote A2—A2 into the meridian plane where it comes to rest.

The method includes in the preferred case the use of the asymptotes, in the displacement-velocity representation (FIG. 2) of a supercritically damped system, as reference lines or switching lines, to determine when the damping should be applied or removed. The asymptotes, which are defined in the displacement-velocity plane of the motion by the magnitude of the supercritical damping ratio of the system, pass through the origin of the displacement-velocity plane and have the slopes of $$(-\delta-\sqrt{\delta^2-1})$$

and $(-\delta+\sqrt{\delta^2-1})$, respectively, for the "fast" and the "slow" asymptote. For high supercritical damping, the slow asymptote forms a relatively small angle with the displacement axis, while the fast asymptote forms an equal angle with the velocity axis. Motion originating on or entering upon the slow asymptote requires infinite time to reach the equilibrium position, generally known as a "creeping motion," while motion along the fast asymptote reaches the proximity of the equilibrium position in the shortest possible time.

In the preferred method, the fast asymptote represents the adeal switching line for applying the damping torque. Instead of using the fast asymptote as the switching line, or the fast and the slow asymptotes as switching lines, any two arbitrarily selected switching lines can be used, as shown in the phase-plane representation of FIG. 6, which is a combination of the circular trajectories of FIG. 1 and the family of trajectories for $\delta=10$ of FIG. 2. The lines A1—A1 and A2—A2, respectively, represent the slow and fast asymptotes, for a given supercritical damping ratio.

S1 and S2 are switching lines passing through the origin of the $\psi$, $\psi'$ plane and forming an angle $\gamma$ between them. The angle $\gamma$ is proportional to the time interval of undamped precessional motion along a circular trajectory from S1 to S2 in the phase plane for small angles of $\psi_0$, such that the system is essentially linear. A timing sequence in accordance with the present invention is provided whereby the gyroscope is uncaged at an initial azimuth angle $\psi_0$ and then allowed to precess undamped through an interval $\tau_0$ at the end of which the undamped precession circle 30 intersects switching line S2 at point $C_0$. At this point the supercritical damping is switched on and the representative point P proceeds along the damped trajectory 31, which is parallel to the [fact] *fast* asymptote, A2—A2, until at $B_1$, it is intercepted by the switching line S1. The damping is now removed and the gyro allowed to precess freely with the representative point following a circular trajectory 32 for an interval given by the angle $\gamma$ between the switching lines S1 and S2, at the end of which interval it is intercepted by the switching line S2 at point $C_1$. With accurate timing the time intervals corresponding to the arcs $\overline{B_0C_0}$, $\overline{B_1C_1}$, $\overline{B_2C_2}$, are all equal. Similarly, the damped trajectory segments $\overline{C_0B_1}$; $\overline{C_1B_2}$; $\overline{C_2B_3}$, etc. all correspond to equal time intervals. As a consequence, the representative point will follow the zigzag path between the switching lines until after a sufficient number of cycles it reaches the proximity of the meridian plane.

The ratio between the azimuth displacement amplitudes of any two consecutive cycles is constant. Thus, $$\left[\frac{\Psi_{n+1}}{\Psi_n}=\rho=\text{constant}\right]$$

$$\frac{\psi_{n+1}}{\psi_n}=\rho=constant$$

One can then express the amplitude after n complete cycles by [$\psi n=(\psi^{0\cos\Phi})\rho^n$] $\psi_0=(\psi_0\ cos\ \varphi)\rho^n$ where [$\rho$] $\varphi$ is the angle between the switching line S1 and the $\psi$ axis.

Figure 6:
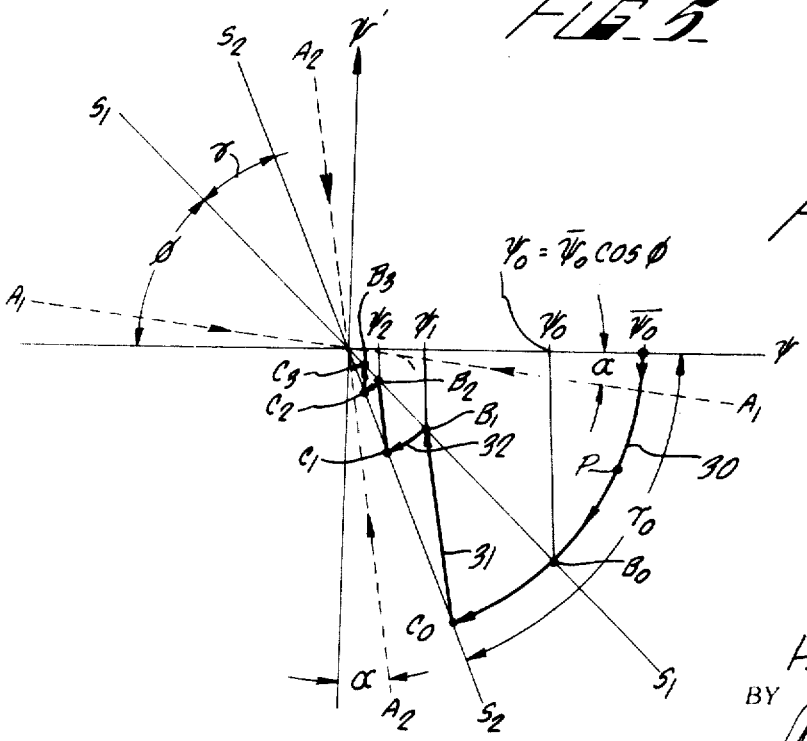
FIG. 6 is a phase-plane representation of the general method of iterative damping in accordance with the present invention.
Figure 1:
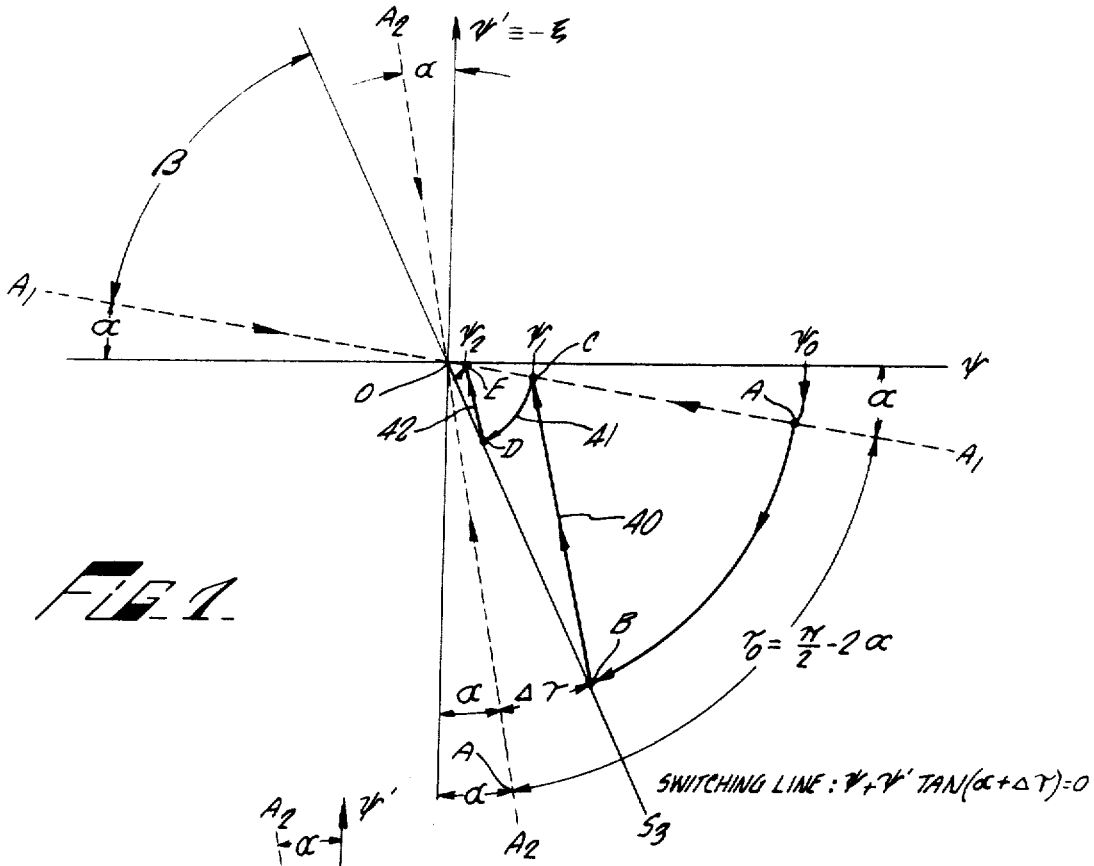

One notes from FIG. 6 that $$\left[\rho=\frac{\Psi_{n+1}}{\Psi_n}\right]\rho=\frac{\psi_{n+1}}{\psi_n}$$

will decrease as [$\Phi$] $\varphi$ gets larger and $\gamma$ gets smaller, resulting in a greater reduction in amplitude after a given number of cycles. However, unavoidable errors in timing make such an improvement illusory since the absolute error in a timing interval could under these conditions, even be equal to the length of the interval itself. As a result, the "switching lines" will not remain in their fixed, predetermined positions, but will shift relative to each other, in such a way as to cause the magnitudes of the angles [Φ] $\varphi$ and $\gamma$ to vary in a prohibitive and intermediate manner. To overcome the possibility of errors in timing, the slow asymptote is alternatively used as one of the switching lines. In this way, every undamped interval will be connected from a fixed reference line.

Although the use of the slow asymptote as a reference for the initiation of the undamped intervals tends to ensure that the end of the undamped interval and the beginning of the following damping interval will occur at the point where the trajectory of the undamped precession intersects the fast asymptote, other circumstances may conspire to end the undamped [precession] interval either before or after intersection with the fast asymptote. Thus, the timer will be subject to errors, for example, the local latitude is not always accurately known, the period of the gyroscope increases as the initial amplitude gets larger, etc., all of which adds up to the fact that seldom, if ever, will the damping interval be initiated on the fast asymptote, when it is selected as a switching line.

Thus, even when the fast asymptote is selected as the switching line for the application of damping, the damping is made iterative, i.e., the cycle, made up of the undamped interval and the damping interval, is repeated a sufficient number of times, so as to reduce the amplitude of the gyroscope to an acceptable value. The iterative damping, with the slow and fast asymptotes used as "switching lines," is depicted graphically in FIGS. 7, 8, and 10.

In FIG. 7, it is assumed that the error, $\Delta\tau$ (corresponding to an error of $\Delta\tau/\omega o$ in real time), in the undamped time interval $$\tau_0=\frac{\pi}{2}-2\alpha$$

is negative, so that the damping interval is initiated prematurely, at B, an angle $\Delta\tau$ ahead of the fast asymptote, thus making the switching line S3 pass through B. As a result, the damped motion now takes place along the trajectory 40 which passes through point B. The magnitude of the error angle $\Delta\tau$ is exaggerated in FIGS. 7, 8, and 10, similar to the exaggeration of the angle $\alpha$ for ease of drawing. These angles are only illustrative and are not limiting.

The trajectory 40 is virtually parallel to the fast asymptote A2—A2, and is "captured" at point C by the slow trajectory A1—A1, on which it comes to a virtual stop and then "creeps" toward the origin at an extremely low rate. A few seconds after the representative point has been "captured" by the slow asymptote, the damping is switched off by the timer, and the gyroscope resumes its free precession, with the representative point P now moving along the circular trajectory 41 or arc $\overline{CD}$. Since the angle $\overline{COD}=\overline{AOB}=\beta$, it is clear that, at the end of the undamped time interval the representative point P will be at D on the "switching line" $\overline{OB}$, or S3. This switching line S3 is defined by the equation $\psi+\psi'$ tan $(\alpha+\Delta\tau)=0$, while the ideal switching line, i.e., the fast asymptote, has the equation [$\psi+\psi$ tan $\alpha a=0$,] $\psi+\psi'$ *tan* $\alpha=0$. At the end of the undamped time interval, the timer 21 again switches on the damping and the representative point now proceeds along the damped trajectory 42 through D, until it is captured at E by the slow asymptote. The iteration may be continued in this manner, until the amplitude of the gyroscope oscillation has been reduced below the magnitude of the allowable error.

When the timing error is positive, and the undamped trajectory extends an angle $\Delta\tau$, beyond the fast asymptote, the damping process will have the appearance shown in FIG. 8, which is self-explanatory in view of FIG. 7, with the second switching line now being defined by the equation: $\psi+\psi'$ tan [$(\alpha-\Delta'=0$.] $(\alpha-\Delta\tau)=0$.

In order to determine the attenuation of the gyroscope amplitude after a certain number of iterations of the damping process, one may apply the following considerations: the angle $\alpha$ is less than 3° for $\delta=10$, so that by reference to FIGS. 7 and 8, it is seen that $\psi_1\approx\psi_0\Delta\tau$ or $$\left[\frac{\Psi_1}{\Psi_0}\approx\Delta\tau\right]\frac{\psi_1}{\psi_0}\approx\Delta\tau$$

Since this ratio is constant for a given error, $\Delta\tau$, one obtains readily the residual amplitude of the gyroscope oscillation after n iterations: $\psi_n=\psi_o(\Delta\tau)^n$.

For an exemplary meridian-seeking gyroscope one can, for the purpose of illustration, assume that one-quarter period of undamped precession will require about 60 seconds. The transversal of the arc between the slow and fast asymptote then requires, approximately 56 seconds for a damping ratio of 10. Assuming the very pessimistic value of $\Delta\tau=0.05$ rad., or [$\Delta t$=seconds.] $\Delta t=2$ *seconds*, the undamped interval will be about 56 seconds ±2 seconds. From both analytical and graphical investigations, it has, furthermore, been found that 12 seconds of time is adequate for the damped interval, as well as for the initial damping interval. The time interval sequence to be generated by the timer 21 will thus have the appearance shown schematically in FIG. 4, where the negative timing error, $\Delta\tau$, or minus 0.05, or the equivalent of minus 2 seconds has been assumed.

If the initial amplitude is, say 5°, the amplitude of the gyroscope after four interations of the damping cycle will be

[$\psi_4={}^0(0.05)^4 3.125\times10^{15}$] $\psi_4=5^0\ (0.05)^4=3.125\times10^{-5}$ degrees ≈0.1 seconds of arc. In fact for this small initial amplitude sufficient accuracy is obtained in most cases with only three cycles of iteration, since

[$\psi_3={}^0(0.05)^3\approx2$] $\psi_3=5^0(0.05)^3\approx2$ seconds of arc. Furthermore, for many applications even two iterations, for which $\psi_2=40$ seconds of arc, would be adequate.

Figure 9:
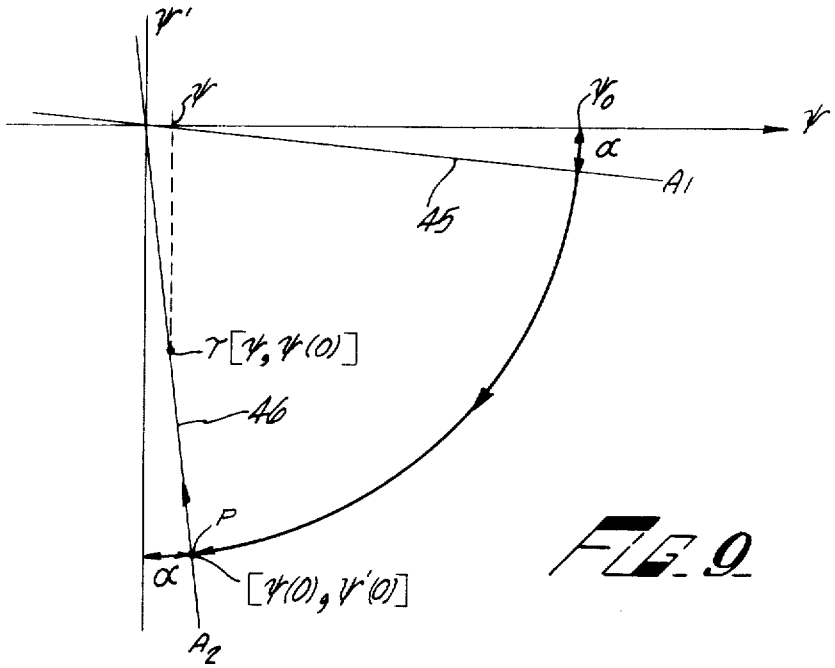
FIG. 9 is a phase-plane representation of the motion of an undamped element and a supercritically damped element along the fast asymptote.

The interval for damping along the fast asymptote for the illustrative gyroscope having a natural undamped period of 240 seconds may be calculated by reference to the phase plot of FIG. 9.

The two asymptotes on the phase plot are derived in the following manner. The diagram depicts the solution for the equation $$\psi'\frac{d\psi'}{d\psi}+2\delta\psi'+\psi=0 \qquad (7)$$

Setting $$\frac{d\psi'}{d\psi}=m$$

and solving equation (7) for $\psi'$, one obtains $$\psi'=\frac{-\psi}{m+2\delta} \qquad (12)$$

which, for any contant value of m, defines a straight line through the origin of slope $-1/m+2\delta$. Thus, in the $\psi$, [(]$\psi'$ plane (the phase-plane), every solution curve or trajectory must cross the isocline, given by equation (12), with the slope m. Isocline is the mathematical term for a curve, such that when crossed by a family of trajectories, every trajectory crosses the curve at the same slope with respect to the coordinate axes. By assigning different values to m, a family of isoclines results, the m-values of which define the slope of the trajectories that cross them.

There are several specific values of m that are of special interest. Thus, the isocline for [$m=\infty$] $\eta=\infty$ is $\psi'=0$, i.e, the $\psi$-axis, and all trajectories must cross this axis at right angles to it. Of particular interest is the case in which the directions of the trajectories are the same as the direction of the isocline, or $$\left[m\frac{\psi'}{\psi}\right] m=\frac{\psi'}{\psi}$$

Substituting this value of $\psi'/\psi$ in equation (12) gives a second degree algebraic equation in m, the roots of which are $$[m=-\delta\pm\sqrt{\delta^2-1}, \text{ or } m=-\delta\pm\eta]$$

$$m=-\delta\pm\sqrt{\delta^2-1}, \text{ or } m=-\delta\pm\eta$$

Substituting these two values of m in equation (12) gives the two isoclines $$\psi'=-\frac{\psi}{\delta+\eta};\ \mathrm{m}=-\delta+\eta \qquad (12a)$$

$$\psi'=-\frac{\psi}{\delta-\eta};\ \mathrm{m}=-\delta-\eta \qquad (12b)$$

Since the slopes of the trajectories must be parallel to these two isoclines at every point on them, the trajectories cannot cross, but must approach these lines asymptotically. Equations (12a) and (12b) thus define two asymptotes of the phase plane. The asymptote defined by equation (12a) has a small negative slope, while the one defined by equation (12b) has a large negative slope. Equation (12a) defines the slow asymptote and equation (12b) defines the fast asymptote. These equations can be rewritten in either of the following forms. Slow asymptote:

$$\psi+(\delta+\eta)\psi'=0(12ai) \text{ or } \psi'+(\delta-\eta)\psi=0 \qquad (12aii)$$

Fast asymptote:

$$\psi+(\delta+\eta)\psi'=0(12bi) \text{ or } \psi'+(\delta+\eta)\psi=0 \qquad (12bii)$$

The asymptotes are drawn on the phase-plot of FIG. 9, with the slow asymptote being line 45 and the fast asymptote being line 46.

Assuming a representative point P starting at the intersection of the circular trajectory for undamped precession with the fast asymptote and the application of damping at this time, the time interval for damping can be calculated.

The equation (12bii) for the fast asymptote, line 46 can be written in the form $$\frac{d\psi}{d\tau}=-(\delta+\eta)\psi \qquad (13)$$

and solving this for $\tau$ $$-\tau=\frac{1}{\delta+\eta}\int\frac{d\psi}{\psi} \qquad (14)$$

or $$-\tau=\frac{1}{\delta+\eta}\ln\psi+\mathrm{C} \qquad (15)$$

At the beginning of the damping interval, $\tau=0$ and $\psi=\psi(0)$, which makes $$\mathrm{C}=-\frac{\ln\psi(0)}{\delta+\eta}$$

The dimensionless time along the fast asymptote becomes then $$\tau=\frac{1}{\delta+\eta}[\ln\psi(0)-\ln\psi] \qquad (16)$$

Since $\alpha$ is small, less than 3° for $\delta=10$, one may set $$\left[\tan\alpha\approx\alpha=\delta-\eta=\delta-\sqrt{\delta^2-1}=\delta-\sqrt{\delta^2\left(1-\frac{1}{\delta^2}\right)}\right]$$

$$\tan\alpha\approx\alpha=\delta-\eta=\delta-\sqrt{\delta^2-1}=\delta-\sqrt{\delta^2\left(1-\frac{1}{\delta^2}\right)}$$

$$=\delta-\delta\sqrt{1-\frac{1}{\delta^2}}.$$

Since $$\frac{1}{\delta_2}\ll 1,\ \sqrt{1-\frac{1}{\delta^2}}$$

can be approximated by $$\left[1-\frac{1}{2\delta},\right.$$

so that $$\left.\delta-\delta\sqrt{1-\frac{1}{\delta^2}}=\delta-\delta+\frac{1}{2\delta}.\right]$$

$$1-\frac{1}{2\delta^2}$$

*so that*

$$\delta-\delta\sqrt{1-\frac{1}{\delta^2}}=\delta-\delta+\frac{1}{2\delta}.$$

Thus $$\tan\alpha\approx\alpha=\delta-\eta\approx\frac{1}{2\delta}.$$

Again, because of the smallness of $\alpha$, one can write $$\psi(0)=\psi_0\alpha=\frac{\psi_0}{2\delta}$$

Consequently, the dimensionless time $\tau$ along the fast asymptote is given in terms of the distance $\psi$ from the origin:

$$\left[\frac{\tau=\ln\left(\frac{\Psi_0}{2\delta}\right)-\ln\Psi}{\delta+\eta}\right]$$

$$\tau=\frac{\ln\left(\frac{\psi_0}{2\delta}\right)-\ln\psi}{\delta+\eta} \qquad (17)$$

corresponding to the real time $$\left[t=\frac{\ln\left(\frac{\Psi_0}{2\delta}\right)-\ln\Psi}{\omega_0(\delta+\eta)}\right]$$

$$t=\frac{\ln\left(\frac{\psi_0}{2\delta}\right)-\ln\psi}{\omega_0(\delta+\eta)} \qquad (18)$$

Since $\ln(0)=-\infty$, it is seen that even along the fast asymptote it theoretically requires infinite time to reach the origin. This presents no problem, however, since it is not necessary to reach the origin, but only to get sufficiently close to it in a reasonable time. To obtain a numerical answer, as an example, let it be assumed that the time to approach within one second of arc of the origin, which is very little error or displacement from the equilibrium position, is desired for a linear system with an initial azimuth angle of $$\left[\Psi_0=\frac{1}{10}\right]\psi_0=\frac{1}{10}$$

radian. The $\psi$-axis position of one second of arc is then, approximately, $[5\times10^{15}\psi 0.]$ $5\times10^{-5}\psi_0$.

Substituting this value of $\psi$ and the natural undamped period for the frequency $[\omega o]$ $\omega_0$ in the expression for t, (equation 18) the following result is obtained:

$$\mathrm{t}=\frac{\ln\left(\frac{10{,}000}{\delta}\right)}{\omega_0(\delta+\eta)} \qquad (19)$$

or $$\mathrm{t}=\frac{\mathrm{T}}{2\pi(\delta+\eta)}\ln\left(\frac{10{,}000}{\delta}\right) \qquad (20)$$

For the illustrative gyroscope having a natural undamped period T of 240 seconds and a damping ratio of 10, the time to reduce the displacement from 0.1 radians to 1 second of arc is $$t=\frac{240}{2\pi(19.95)}\ln\left(\frac{10,000}{10}\right)$$

t=13.3 seconds.

For the example of an initial displacement of $\psi_0=0.1$ radians and a residual displacement of $\psi=1$ second of arc the ratio $\sigma$ between the damped interval of time and the undamped interval of time may be written $$\sigma=\frac{t}{\frac{T}{4}-2\alpha}=\frac{T\ln\left(\frac{20,000}{2\delta}\right)}{2\pi\left(\frac{T}{4}-\frac{1}{\delta}\right)(\delta+\eta)}$$

or, since $$\frac{T}{4}\gg\frac{1}{\delta},$$

$$\sigma\approx\frac{6.3-0.635\ln(2\delta)}{\delta+\eta}$$

The general expression for the ratio between the damped interval of time and the undamped interval of time is $$\sigma=\frac{t}{\frac{T}{4}-2\alpha}=\frac{T\left[\ln\left(\frac{\psi_0}{2\delta}\right)-\ln\psi\right]}{2\pi\left(\frac{T}{4}-\frac{1}{\delta}\right)(\delta+\eta)} \quad (21)$$

Figure 10:
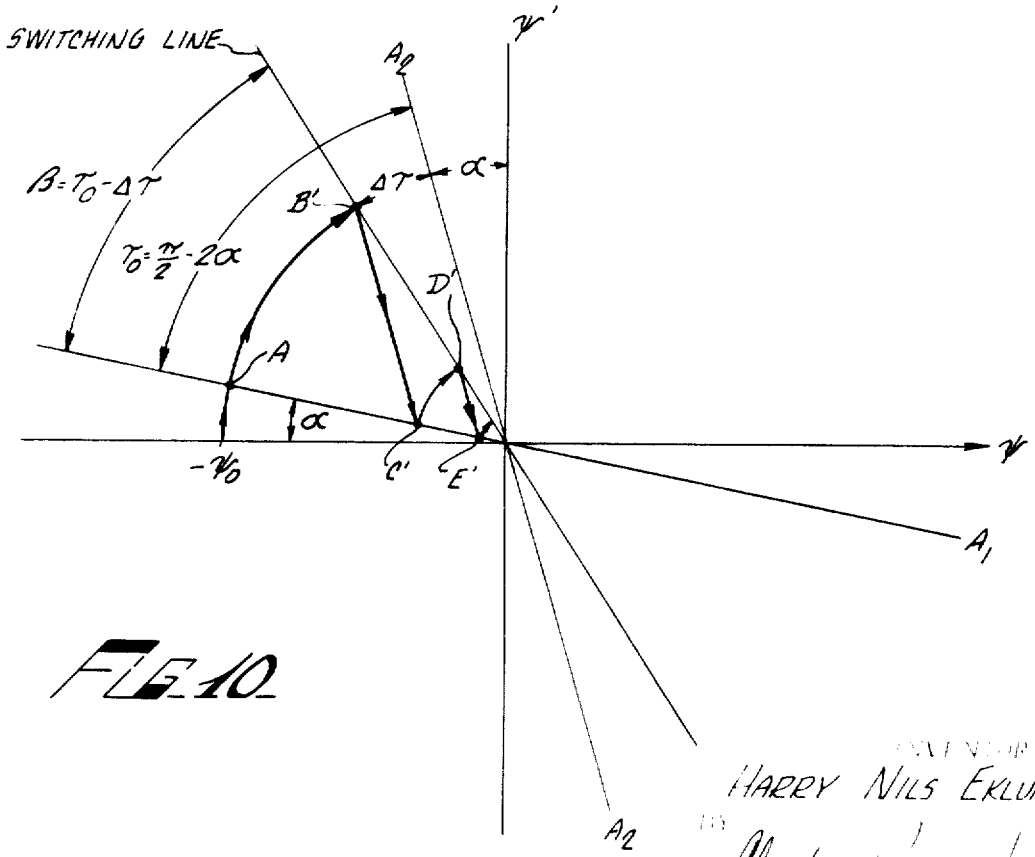
FIG. 10 is a phase-plane representation graphically depicting the iterative damping in accordance with the present invention for a moving element having a negative initial angle.

The above analysis also holds true for negative azimuth angles. A phase representation of iterative damping for an initial negative azimuth angle and a negative timing error is shown in FIG. 10.

All of the previous considerations and results have been based on the assumption that the initial angle, $\psi_0$, of the gyroscope oscillation is small, say less than 5°, so that the undamped precession angle, $\tau_0$, is independent of the magnitude of $\psi_0$, that is, the system is assumed to be linear. Actually, this is of course not generally true as the magnetic compass used for rough alignment of the meridian-seeking instrument with the meridian, may have a large unknown declination at the point of setup of the instrument, and as a result the initial angle $\psi_0$ may be come too large to justify the assumption made in setting up equation 1, namely that $\sin\psi=\psi$. Consequently, the more exact equation for the undamped precessional motion of the gyroscope, in the phase-plane coordinates, is $$\left[\Psi'\frac{d\Psi'}{d\Psi}+\sin\Psi=0\right]$$

$$\psi'\frac{d\psi'}{d\psi}+\sin\psi=0 \quad (22)$$

If this equation is integrated twice and solved for the dimensionless time, $\tau$, one obtains the undamped precession interval 30 between the two asymptotes:

$$\left[\tau_0=\tau_2-\tau_1=\int_{\psi_1}^{\psi_2}\frac{d\Psi}{\sqrt{2(\cos\Psi-\cos\Psi_0)}}=\int_{\psi_0\sin\alpha}^{\psi_0\cos\alpha}\frac{d\Psi}{\sqrt{2(\cos\Psi-\cos\Psi_0)}}\right]$$

$$\tau_0=\tau_2-\tau_1=\int_{\psi_1}^{\psi_2}\frac{d\psi}{\sqrt{2(\cos\psi-\cos\psi_0)}}=\int_{\psi_0\sin\alpha}^{\psi_0\cos\alpha}\frac{d\psi}{\sqrt{2(\cos\psi-\cos\psi_0)}} \quad (23)$$

The above integral can be solved in terms of elliptic functions, but this rather lengthy procedure can be evaded by resorting to an approximation based on the following reasoning: Since the angle $\alpha$ is small, of the order of 3°, one may, for the sake of simplicity, instead of considering the arc $$\left(\frac{\pi}{2}-2\alpha\right)$$

consider the full arc $(\pi/2)$, i.e., the quarter period. If one now compares the length of the quarter period, for the case that $\psi_0$ approaches zero with that for say, $\psi_0=45°$, one obtains the difference $$\begin{aligned}\Delta\tau_1&=[\tau_0]\psi_0=45°-[\tau_0]\psi_0=0\\&=1.633-1.571\\&=.062\text{ radians}\end{aligned}$$

or $$\Delta t_1=\frac{T}{2\pi}\Delta\tau_1=2.37\text{ seconds}$$

Thus, at the end of the first undamped precession interval, $\tau_0$, the representative point P will be lagging by an angle $\Delta\tau$ of about 0.062 radians, in addition to the assumed timing error $\Delta\tau_0$. The ratio of the amplitudes after 1 cycle of damping will then, be approximately $$\frac{\psi_1}{\psi_0}=\Delta\tau_0+\Delta\tau_1=.05+.0612=0.112$$

so that the initial 45° angle is now reduced to approximately 5°. As a consequence, in the next and the following damping cycles, the error, $\Delta\tau_1$, due to the initial angle, vanishes, and only the assumed timing error of 0.05 radians is present. Consequently, after 4 cycles of damping, the initial amplitude of 45° is reduced to $$\begin{aligned}\psi_4&\approx0.112\times(0.05)^3\times45°\\&[\approx6.3\times^{14}\text{ degrees}]\\&\approx6.3\times10^{-4}\text{ degrees}\\&\approx2.27\text{ seconds of arc.}\end{aligned}$$

It now becomes evident that even with much larger initial angles, one can achieve a rapid attenuation of the gyroscope amplitude of oscillation. For example, taking $\psi_0=90°$ and the same timing error of 0.05 rad., one obtains in a similar manner after 4 cycles of damping $$\psi_4\approx0.233\times0.0552\times(0.05)^2\times90°\times3600=14\text{ sec. of arc.}$$

Obviously, by increasing the number of damping cycles to 5 or 6, adequate alignment with the meridian can be obtained with initial angles approaching 180°, and with a total time for alignment of about 8 min. (n=7). This is in contradistinction to the long time required for alignment of a continuously damped exemplary gyroscope when the initial angle approaches 180°.

Figure 11:
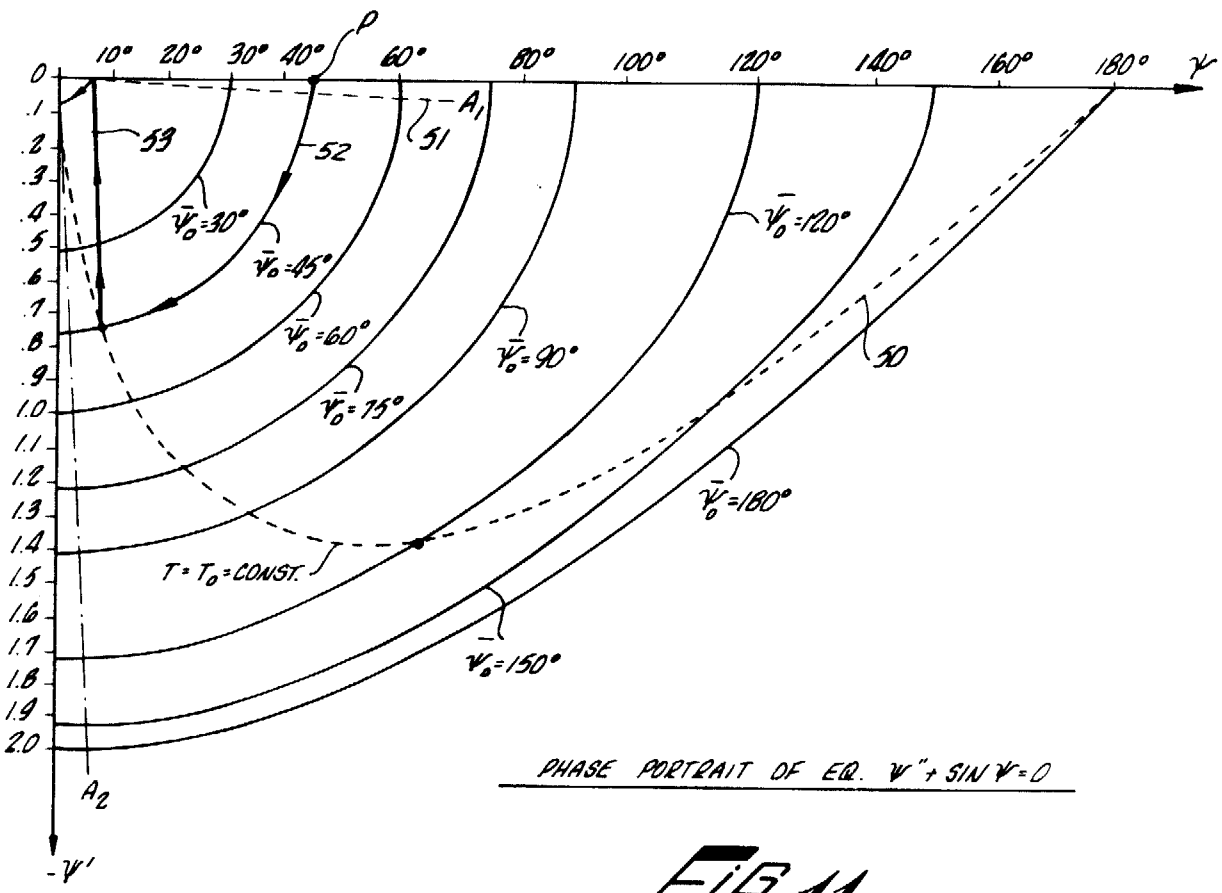
FIG. 11 is a phase-plane representation of large initial angle undamped motion of a moving element which has a restoring force that is proportional to the sine function for the displacement.

FIG. 11 is a phase-plane representation of the undamper precessional motion of the gyro for initial angles between 0 and +180°. The portrait is shown only for one quadrant, since the curves in the other 3 quadrants are the mirror images of the adjacent quadrants. The curves begin to deviate appreciably from the circular form, associated with small initial angles, as the latter go beyond, approximately, 5°. This is made evident by the dashed curve 50, which represents $\tau_0=constant$, [$\tau_0$=cons.,] which curve intersects all of the precession curves at points of equal time, $\tau_0$, from the time of uncaging. Thus, with the timing of the undamped precession interval kept constant at the value $\tau_0$, the damping will be switched in at the point, where the particular curve intersects the curve 50. This will cause the representative point to proceed along a damped trajectory toward the slow asymptote 51. Whether it arrives at the asymptote before switching to the next undamped precession interval takes place, depends on the magnitude of the initial angle and on the length of time that has been allotted to the damping interval. In the diagram of FIG. 11, there is illustrated the case of the gyroscope being uncaged at an initial angle of 45°, which case has been considered in the discussion of the numerical evaluation of the settling accuracy.

In FIG. 11, the representative point P proceeds along the undamped precessional curve 52 for the interval of time allotted for undamped precessional movement. The damping is then applied and the representative point P now proceeds along a damped trajectory 53 and approaches the slow asymptote 51. At the end of this first cycle the azimuth angle is reduced from 45° to less than 5°. The damping cycles are then repeated until the oscillatory element is within the allowable error with respect to the meridian plane. It should be noted that for large angles, neither the asymptotes nor the damped trajectories are straight lines. However, this is of no consequence for a qualitative evaluation of the behavior at large initial angles.

For purposes of illustration, it has been assumed that the damping ratio $\delta=10$. However, this damping ratio may be varied over a wide range.

The larger the damping ratio becomes, the shorter will be the time interval required to deprive the gyroscope or other oscillatory element of the velocity gained during the undamped precession interval. Thus, in the limit, as $\delta$ approaches infinity, the trajectories of FIG. 2 *become* [becomes] parallel straight lines, perpendicular to the $\psi$-axis, while the slow and fast asymptotes become coincident with the $\psi$-axis and $\psi'$-axis, respectively.

This condition can, of course, not be realized. Furthermore, it does not appreciably shorten the time of a single cycle. One notes that the undamped precession interval is now $$\tau_0=\frac{\pi}{2} \text{ for } \Delta\tau=0$$

while the interval along the damped trajectory is zero. Thus, for the previously considered gyro period of 240 seconds, the time of the undamped precession interval, $$\tau_0=\frac{\pi}{2}$$

will be 60 seconds, as compared with 54 seconds for $\delta=10$, assuming a negative timing error of 2 seconds. Thus, for four iterations after an initial damping interval of 12 seconds, the total saving in time would be 36 seconds.

Although this case is only academic, it indicates nevertheless that very little time is saved by using even a very large value of $\delta$. This is, of course, due to the fact that most of the time required for a complete cycle is used up in the more or less constant undamped precession interval. Furthermore, the power required for the damping torques increases at least as $\delta^2$. Thus, increasing the magnitude of the damping ratio from $\delta=10$ to, say, $\delta=50$, would require at least 25 times more power, as well as larger coils, in order to effect a time saving of approximately 13 percent.

Consider now the case that the damping ratio be reduced from $\delta=10$ to, say $\delta=2.5$. This increases the time along the damped trajectory by about 4 times that for $\delta=10$, while the length of the undamped precession interval reduces to about 44 seconds for $\Delta\tau=0$. The time for a complete cycle including the initial damping interval is now $(4)(12)+44=92$ sec. This is an increase of approximately 35 percent over the 68 seconds per cycle for $\delta=10$, which increase would be unacceptable in many applications.

Thus, one can conclude from both practical and theoretical considerations that, although no optimum value of the damping ratio exists per se, an optimum range of the damping ratio may be found to exist between, say $\delta=5$ and $\delta=20$, although $\delta$ may be any value over 1. The assumed value of $\delta=10$, used in describing the iterative damping process, can, therefore, be considered representative of this process.

When the meridian-seeking gyroscope is used at different latitudes, it will be necessary to adjust the timing and damping control so as to compensate for the change in latitude. However, such compensation need not be exact; an error of $\pm 1°$ in latitude can be easily tolerated. The need for the compensation of the timing control is due to the fact that the period of the gyroscope is a function of the latitude:

$$T_\lambda=2\pi\sqrt{\frac{H}{M\omega_e \cos\lambda}}=\frac{\text{Constant}}{\sqrt{\cos\lambda}} \qquad (24)$$

so that in order to avoid an error in the undamped precession interval, it is necessary to vary the latter with latitude in the same way as T varies, i.e., instead of making the undamped precession time interval $t_0$, constant, one makes it vary in the same manner as T:

$$t_0=\frac{\tau_0}{\omega_0}=\left(\frac{\pi}{2}-2\alpha\right)\sqrt{\frac{H}{M\omega_e \cos\lambda}} \qquad (25)$$

For this purpose, a latitude compensator 25 is provided in the control system of FIG. 3 which will allow the same proportional adjustment of each of the individual undamped precession time intervals depicted in FIGS. 4 and 5. This can be achieved in several different ways, depending on the type of timing device employed. With mechanically or electromechanically driven timers, the speed of the timer may be varied in inverse proportion to the gyroscope period, i.e. in proportions to $\sqrt{\cos\lambda}$, so as to expand or contract the timing sequence in a corresponding manner. In the case of an electronic timing device, either a variation in the electronic time constants, or a variation in the integrator voltage of a timing device, proportional to the gyroscope period, may be utilized for the adjustment of the timing control.

Although the damping control system and method have been described on the basis of employing torque linearly proportional to the velocity of the azimuth motion, damping torques that are not linearly proportional to the azimuth velocity may also be used. One may, for example use a damping torque proportional to the square of the azimuth velocity $$T_\delta=C|\Psi|\Psi \qquad (26)$$

Alternatively, one may use a damping torque which for small azimuth velocities is predominantly proportional to the velocity, but which for high azimuth velocities is predominantly proportional to the square of the velocity. Such a torque is given by $$T=C[1+k|\psi|\psi \qquad (27)$$

where the value of the constant k is appropriately chosen so as to suit the requirements.

Various changes may be made in the details of construction of the system and in the method without departing from the spirit and scope of the invention as defined by the appended claims.

I claim:

1. A method of damping the motion of a mechanical system element which is oscillating about an equilibrium position, the motion of the element having a substantially undamped natural period of oscillation, the method comprising the step of applying supercritical damping force to the element for a selected interval of time commencing from when the ratio of the instantaneous velocity of the element toward its equilibrium position to the instantaneous displacement of the element from its equilibruim position is approximately equal to the [ratio of $\pi$ to the product of the undamped natural period of oscillation and the damping ratio] *product of $4\pi$ and the damping ratio divided by the undamped natural period of oscillation.*

2. A method in accordance with claim 1 including the additional steps of repeating the step a selected number of times so as to further damp the motion of the element.

3. The method in accordance with claim 1 wherein the selected interval of time, t, is given by the expression $$t=\frac{T\left[\ln\frac{\psi_0}{2\delta}-\ln\psi\right]}{2\pi\left[\delta+\sqrt{\delta^2-1}\right]}$$

where T is the natural undamped period, $\psi_0$ is the initial displacement from the equilibrium position, $\psi$ is the displacement from the equilibrium position at the end of said selected interval of time, and $\delta$ is the supercritical damping ratio.

4. The method in accordance with claim 1 wherein the supercritical damping force is proportional to the velocity of the moving element.

5. The method in accordance with claim 1 wherein the supercritical damping force is proportional to the square of the velocity of the moving element.

6. The method in accordance with claim 1 wherein the supercritical damping force is a function of the velocity of the moving element.

7. A method in accordance with claim 1 wherein the supercritical damping ratio is approximately 10.

8. A method in accordance with claim 1 wherein the supercritical damping ratio is between 5 and 20.

9. The method of damping in accordance with claim 1 including in addition a first initial step of applying supercritical damping force to the element for a selected interval of time and a second initial step of removing the supercritical damping force thereby allowing the element to move undamped until supercritical damping force is reapplied in accordance with claim 1.

10. The method in accordance with claim 9 wherein the time at which the supercritical damping force is removed precedes the time at which supercritical damping force is reapplied by an amount which is approximately equal to the quantity t, where t is given by the expression $$t=\left[\frac{\pi}{2}-\frac{1}{\delta}\right]\left[\frac{T}{2\pi}\right]$$

where $\delta$ is the supercritical damping ratio and T is the undamped natural period.

References Cited

The following references, cited by the Examiner, are of record in the patented file of this patent or the original patent.

UNITED STATES PATENTS

| | | | |
|---|---|---|---|
| 2,802,279 | 8/1957 | Agins | 33—324 R |
| 3,125,885 | 3/1964 | Malone | 73—517 |

FOREIGN PATENTS

| | | | |
|---|---|---|---|
| 314,703 | 10/1919 | Germany | 33—324 R |

WILLIAM D. MARTIN, Jr., Primary Examiner

UNITED STATES PATENT OFFICE

CERTIFICATE OF CORRECTION

PATENT NO. : Re.28,349

DATED : February 25, 1975

INVENTOR(S) : Harry Nils Eklund

It is certified that error appears in the above-identified patent and that said Letters Patent are hereby corrected as shown below:

Col. 3, line 21, "trajectory" should read --trajectories--.
Col. 4, line 50, after "and" and before "sets" insert --also--.
Col. 5, line 58, "gryscope" should read --gyroscope--.
Col. 6, line 68, "rpresenting" should read --representing--;
line 68, "angles ,a" should read --angles, a--.
Col. 7, line 9, "$\eta\sqrt{\quad}$" should read --$\eta=\sqrt{\quad}$--.
Col. 8, line 6, "paint" should read --point--; line 56, "appartus" should read --apparatus--.
Col. 9, line 71, "elevational" should read --elevation--.
Col. 10, line 75, "carriers" should read --carries--.
Col. 11, line 7, "$(2_2\psi')$" should read --$(2\delta\psi')$--; line 12, "$\delta($" should read --$I_\eta$--.
Col. 12, line 16, "adeal" should read --ideal--; line 62, "$]\ \psi o=$" should read --$]\ \psi_n=$--.
Col. 14, line 30, "interations" should read --iterations--;
line 73, "$\eta=\infty$" should read --$m = \infty$--;
Col. 15, line 34, the "+" (second occurrence) should read -- - --.
Col. 16, line 4, "$\frac{1}{\delta_2}$" should read -- $\frac{1}{\delta^2}$ --;
line 60, insert "radian." directly after equation;
line 61, delete "radian."
Col. 17, line 43, after "be", insert -- - --. (hyphen)
Col. 18, line 52, "undamper" should read --undamped--.
Col. 20, line 44, equation (26) should read --$T_\delta = C|\dot{\psi}|\dot{\psi}$--;
line 50, equation (27) should read --$T^\delta = C[1+k|\dot{\psi}|]\dot{\psi}$--.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*